United States Patent
Matsumoto et al.

[11] Patent Number: 5,969,780
[45] Date of Patent: Oct. 19, 1999

[54] PLASTIC COLOR FILTER MANUFACTURING METHOD AND COLOR FILTER MANUFACTURED IN THE MANUFACTURING METHOD

[75] Inventors: Fuminao Matsumoto, Tokyo; Yasuyuki Takiguchi, Kanagawa; Akihiko Kanemoto, Kanagawa; Tomohiro Inoue, Kanagawa, all of Japan

[73] Assignee: Ricoh Company, Ltd., Tokyo, Japan

[21] Appl. No.: 09/146,336

[22] Filed: Sep. 2, 1998

[30] Foreign Application Priority Data

Sep. 3, 1997 [JP] Japan ................................. 9-254193

[51] Int. Cl.$^6$ .................................................. G02F 1/1335
[52] U.S. Cl. ......................................... 349/106; 359/891
[58] Field of Search ........................ 349/106; 359/891; 430/7

[56] References Cited

U.S. PATENT DOCUMENTS

| | | |
|---|---|---|
| 5,185,074 | 2/1993 | Yokoyama et al. . |
| 5,248,576 | 9/1993 | Yokoyama et al. . |
| 5,399,450 | 3/1995 | Matsushima et al. ............... 430/7 |
| 5,631,111 | 5/1997 | Niu et al. ........................... 430/7 |

FOREIGN PATENT DOCUMENTS

| | | |
|---|---|---|
| 62-38422 | 2/1987 | Japan ................................. 349/106 |
| 2-175897 | 7/1990 | Japan . |
| 3-4202 | 1/1991 | Japan . |
| 3-102302 | 4/1991 | Japan . |
| 4-275505 | 10/1992 | Japan ................................. 349/106 |
| 4-295802 | 10/1992 | Japan ................................. 349/106 |
| 4-295803 | 10/1992 | Japan ................................. 349/106 |
| 5-333329 | 12/1993 | Japan ................................. 349/106 |
| 6-34809 | 2/1994 | Japan . |

OTHER PUBLICATIONS

Tetsuo Saji, et al., "Formation of Organic Thin Films by Electrolysis of Surfactants with the Ferrocenyl Moiety", J. Am. Chem. Soc. 1991, 113, pp. 450–456.

Primary Examiner—James A. Dudek
Attorney, Agent, or Firm—Oblon, Spivak, McClelland, Maier & Neustadt, P.C.

[57] ABSTRACT

An insulating layer is formed on a plurality of electrodes formed on a plastic film substrate, the insulating layer having a plurality of electrode connecting holes formed therein. Electrodes of the plurality of electrodes are selectively connected to an external circuit via respective ones of the plurality of connecting holes. Conductive color filter layers are formed on the thus-connected electrodes by an electrochemical method. A value obtained as a result of subtracting a width of each one of the plurality of electrode connecting holes from a width of a respective one of the plurality of electrodes is large so that a position of the electrode connecting hole is maintained to correspond to a position of the electrode even when the plastic film substrate expands or contracts maximally.

42 Claims, 4 Drawing Sheets

PLASTIC COLOR FILTER MANUFACTURING METHOD AND COLOR FILTER MANUFACTURED IN THE MANUFACTURING METHOD

BACKGROUND OF THE INVENTION

1. Field of the Invention

The present invention relates to a color liquid-crystal display device, and, in particular, to a liquid-crystal display device which is superior as a portable device and uses a plastic-film substrate.

2. Description of the Related Art

Liquid-crystal display devices have been used in various fields. As an information display device, a liquid-crystal display device is a match for a CRT. In particular, in a portable apparatus, it is demanded that a size of the apparatus be small, a weight of the apparatus be light, and power consumption of the apparatus be low. Therefore, a liquid-crystal display device is used in such a portable apparatus in many cases. In almost all cases, a liquid-crystal display device uses a glass as a substrate. However, in a portable apparatus such as a portable telephone, an electronic pocket book or the like, a liquid-crystal display device using a plastic film as a substrate is used. A plastic film has a thickness on the order of 0.1 through 0.3 mm, and the weight thereof is light. Therefore, a plastic film is suitable for being used in a portable apparatus. However, performing fine patterning on a plastic-film substrate is difficult. Further, the dimensions of a plastic-film substrate change due to environmental changes in temperature, humidity and so forth. Therefore, it is difficult to put a color filter using a plastic-film substrate into practice. As a result, in almost all cases, a plastic-film substrate is used in a monochrome display device. A color displaying method which does not use a color filter using a plastic-film substrate has been proposed. However, in this method, the number of colors which can be displayed is limited, and displayed colors are not clear. Further, in this method, it is necessary to strictly control a distance (cell gap) between two substrates. Because control of the distance between two substrates is difficult in a plastic-film liquid-crystal display device, this method has yet to be put into practice.

As methods for manufacturing a color filter for a liquid crystal, various methods such as a dye dissolution method, a pigment dispersed method, an electro-deposition method, a micelle-disruption method, a printing method and so forth have been proposed. (With regard to the micelle-disruption method, see 'Formation of Organic Thin Films by Electrolysis of Surfactants with the Ferrocenyl Moiety', Tetsuo Saji, Katsuyosi Hoshino, Yoshiyuki Ishii, and Masayuki Goto, *J. Am. Chem. Soc.* 1991, 113, 450–456.) In each of the dye dissolution method, pigment dispersed method, printing method and so forth, in forming patterns of red (R), green (G), blue (B) and black (BK), it is necessary to accurately positioning each pattern with respect to the other patterns. For example, first, a black pattern is formed, and, then, red, green and blue patterns are accurately positioned with respect to the black pattern and are thus formed. Further, positioning between the color filter patterns and liquid-crystal driving electrodes is also necessary. An accuracy in positioning depends on material, size, and manufacturing apparatus for a substrate to be used. When a glass substrate is used, it is possible to perform positioning on the order of microns. In comparison to the glass substrate, a plastic substrate changes in dimensions greatly. Not only due to thermal hysteresis but also due to temperature and humidity changes, a plastic substrate changes in dimensions by ±0.1%. Therefore, it is very difficult to perform accurate positioning of color filter patterns. In order to put forming of color filter patterns on a plastic-film substrate into practice, a manufacturing process, which does not need accurate positioning of color filter patterns, or, in which the number of steps which needs accurate positioning is reduced to the utmost, is demanded.

In each of the electro-deposition method and micelle-disruption method of the above-mentioned methods for manufacturing color filters, color filter layers are formed on transparent conductive film patterns electrochemically. Therefore, deviation in positions of the respective colors, R, G, B, with respect to each other does not occur.

Japanese Laid-Open Patent Application No. 6-34809 discloses using electrodes for driving liquid crystal also as electrodes by which color filter layers are formed, as a result of making the color filter layers of conductive material or mixing conductive material in the color filter layers.

Figure 1:
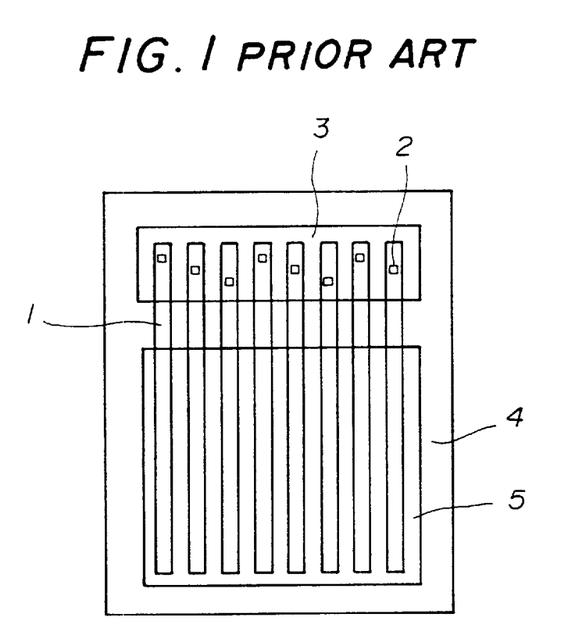
FIGS. 1 and 2 illustrate a method for forming color filter layers disclosed in Japanese Laid-Open Patent Application No. 3-102302.
Figure 2:
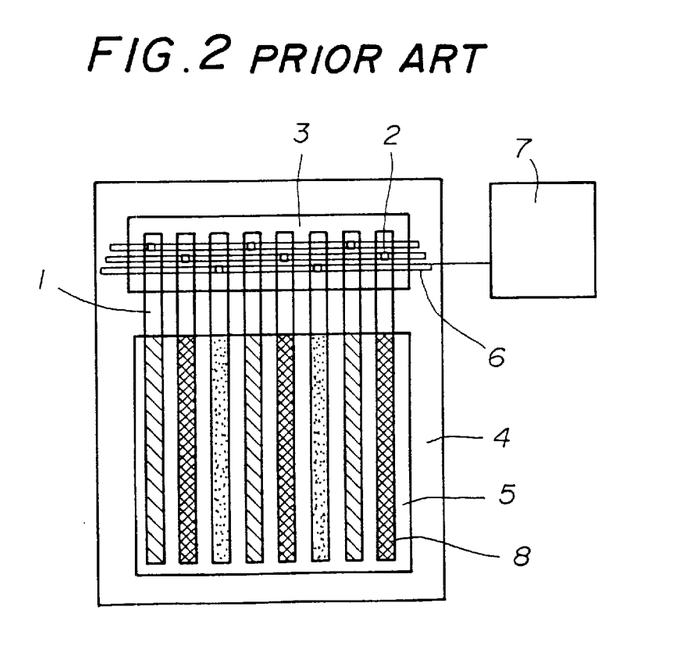

When the color filter layers are conductive, when a plurality of colors (for example, three colors, R, G, B) of color filter layers are formed, it is necessary to selectively connect the electrodes to an external circuit for each color. Generally speaking, the pitch of the electrodes is equal to or less than 100 μm. It is difficult to directly probe each electrode so as to connect the electrode to an external circuit. Therefore, in the art disclosed in Japanese Laid-Open Patent Application No. 3-102302, as shown in FIG. 1, electrode connecting holes 2 are formed in a photosensitive resin 3 so that electrodes 1 for the respective colors R, G, B on a substrate 4 can be selectively connected to an external circuit. Then, as shown in FIG. 2, the electrodes 1 are selectively connected to the external circuit 7 through conductive silver paste 6. Then, a color filter forming area 5 is immersed in electrolytic liquid, and a voltage is applied to the electrodes selectively connected to the external circuit 7. As a result, color filter layers 8 are formed on the electrodes 1, respectively. However, when attempting to form conductive color filter layers on a plastic film in this method, problems such as shifting of the electrode connecting holes 2 from the electrodes 1, poor electrical connection between the electrodes 1 and the silver paste 6, and so forth, due to change in dimensions of the substrate 4, occurred. As a result, good conductive color filter layers could not be formed.

Further, Japanese Laid-Open Patent Application Nos. 2-175897 and 3-4202 disclose methods in which electrode connecting holes 2 are not used, and, electrodes after being colored are cut by etching. However, in either method, manufacturing steps are complicated, and it is difficult to apply the method to a plastic film substrate.

SUMMARY OF THE INVENTION

An object of the present invention is to solve the above-described problems by providing a method for forming conductive color filters by an electrochemical method on a plastic film substrate, this film substrate, and a plastic color liquid-crystal display device using this substrate.

A plastic color filter manufacturing method, according to the present invention, comprises the steps of:

forming an insulating layer on a plurality of electrodes formed on a plastic film substrate, the insulating layer having a plurality of electrode connecting holes formed therein;

selectively connecting electrodes of the plurality of electrodes to an external circuit via respective ones of the plurality of connecting holes, in turn; and forming conductive color filter layers on the thus-connected electrodes in by electrochemical method, wherein a value obtained as a result of subtracting a width of each one of the plurality of electrode connecting holes from a width of a respective one of the plurality of electrodes is large enough so that a position of the electrode connecting hole is prevented from deviating from a position of the electrode even when the plastic film substrate expands or contracts maximally.

The width of each one of said plurality of electrodes at a position where a respective one of said plurality of electrode connecting holes is placed may be greater than a width of the electrode at a position at which the conductive color filter layer is formed on the electrode.

Thus, according to the present invention, as a result of the width of each electrode being widened at the position at which a respective one of the electrode connecting holes is positioned, an allowable range in alignment of the electrode connecting hole with the electrode is widened. Thereby, it is not likely to occur that the position of the electrode connecting hole deviates from the position of the electrode, even when the plastic film substrate expands or contracts maximally. That is, as a result of the width of each electrode being widened at the position at which a respective one of the electrode connecting holes is positioned, the position of the electrode connecting hole does not deviate from the position of the electrode, even when the plastic film substrate which expands or contracts significantly is used.

The electrical connection between selected ones of the plurality of electrodes and the external circuit may be performed through conductive resin which can change in shape in response to a change in shape of the plastic film substrate.

The step of electrically connecting the selected ones of the plurality of electrodes with the external circuit may comprise the steps of:

scattering conductive particles in at least respective ones of the plurality of electrode connecting holes; and performing the electrical connection of the selected ones of the plurality of electrodes with the external circuit through the conductive particles and a conductive material.

A diameter of each of the conductive particles may be larger than a thickness of the insulating layer, the electrical connection being made between selected ones of the plurality of electrodes and the external circuit as a result of the conductive material being pressed on the insulating layer.

The conductive particles may be soft.

The step of electrically connecting the selected ones of the plurality of electrodes with the external circuit may comprise the steps of:

depositing a layer in each of at least respective ones of the plurality of electrode connecting holes; and electrically connecting the selected ones of the plurality of electrodes with the external circuit through the thus-deposited layers and a conductive material.

A thickness of each of the deposited layers may be larger than a thickness of the insulating layer, the electrical connection being made between the selected ones of the plurality of electrodes and the external circuit as a result of the conductive material being pressed on the insulating layer.

The deposited layers may comprise layers formed through plating.

The conductive material may comprise an adhesive tape.

The step of electrically connecting the selected ones of the plurality of electrodes with the external circuit may be performed using a conductive material which has a surface having irregularities of a height on the order of a thickness of the insulating layer.

The irregularities of the surface of the conductive material may comprise soft conductive resin.

The conductive material may comprise an adhesive tape.

A plastic color filter according to the present invention is made in any of the above-described methods.

As a result, good electrical connection is made between the selected ones of the plurality of electrodes and the external circuit. Thereby, the plastic color filter having the conductive color filter layers, without any defects and any color nonuniformity, on the electrodes, respectively, can be formed.

A color liquid-crystal display device according to the present invention comprises:

two substrates; and an electrooptic-material layer, a light transmitting condition thereof being electrically controlled, the electrooptic material layer being sandwiched by the two substrates, wherein, as a result of an electric field being applied to the electrooptic-material layer by a plurality of electrodes, on which conductive color filter layers are formed, the electrooptic-material layer displays information, and wherein at least one of the two substrate comprises any of the above-described plastic color filters.

Thereby, it is possible to provide the color liquid-crystal display device which can perform improved color display.

Other objects and further features of the present invention will become more apparent from the following detailed descriptions when read in conjunction with the accompanying drawings.

DETAILED DESCRIPTION OF THE PREFERRED EMBODIMENTS

A method for manufacturing a plastic color filter according to the present invention and a structure of the plastic color filter will now be described.

As a method for selectively connecting arbitrary ones of a plurality of electrodes formed on a plastic film substrate to an external circuit, an insulating layer having electrode connecting holes formed therein is formed on the electrodes. As such an insulating layer, not only an inorganic film such as that of SiOx, alumina or the like, but also an organic film such as that of epoxy resin, acrylic resin, polyimide resin or the like is used. However, because the plastic film substrate is used, it is preferable to use the organic film for which a processing temperature is relatively low. As a method for forming the electrode connecting holes (which may also be referred to as contact holes) in the insulating layer, an ordinary photolithography process is used. It is possible to simplify the process as a result of using photosensitive resin as the insulating layer. The thickness of the insulating layer may be on the order of 0.1 through 10 $\mu$m. However, in order to provide positive insulation, it is preferable to use the insulating layer having the thickness equal to or more than 0.3 $\mu$m.

Figure 3:
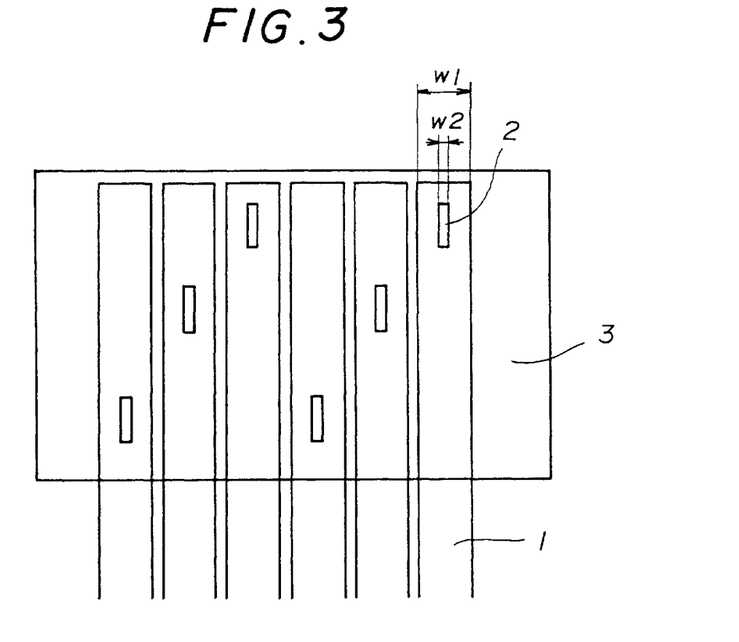
FIG. 3 shows a partial view of a plastic film substrate in a first embodiment of the present invention having a plurality of electrodes 1 and an insulating layer 3 having a corresponding plurality of electrode connecting holes 2 formed therein.
Figure 4:
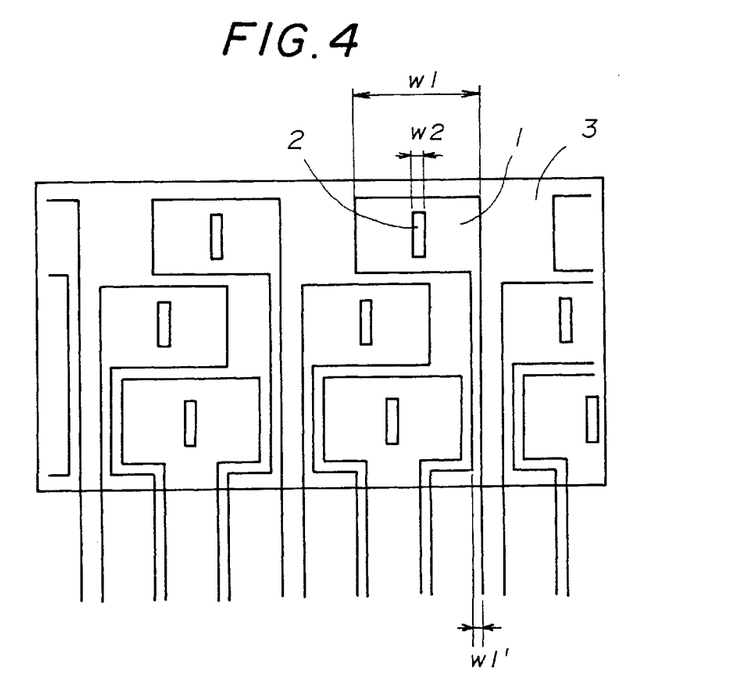
FIG. 4 shows a partial view of a plastic film substrate in a second embodiment of the present invention having a plurality of electrodes 1 and an insulating layer 3 having a corresponding plurality of electrode connecting holes 2 formed therein, wherein the width w1 of each electrode 1 at a position where a respective one of the electrode connecting holes 2 is positioned is widened.

As mentioned above, the dimensions of the plastic film substrate change greatly. Therefore, it is not possible to perform accurate alignment. As a result, as shown in FIG. 3, it is necessary to sufficiently reduce the width of each contact hole 2 in comparison to the width of a respective one of the electrodes 1. For example, when the contact hole 2 having a width w2 of 20 $\mu$m is formed on the electrode 1 having a width w1 of 100 $\mu$m, 80 $\mu$m, which is a difference between the width w1 of the electrode 1 and the width w2 of the contact hole 2, is an alignment margin. However, when the width w2 of the contact hole 2 is excessively reduced in order to obtain a larger alignment margin, it is difficult to achieve positive electrical connection with the electrode 1 via the contact hole 2. Therefore, it is preferable to have the width w2 of the contact hole 2 equal to or more than 5 $\mu$m. In order to achieve more positive electrical connection, it is further preferable to have the width w2 of the contact hole 2 equal to or more than 20 $\mu$m. Therefore, instead of reducing the width w2 of the contact hole 2, the width w1 of the electrode 1 at the position at which the contact hole 2 is formed is widened, as shown in FIG. 4. Thereby, the alignment margin is increased. Thus, even when using the plastic film substrate which significantly changes in dimensions, the contact holes 2 are formed through the photolithography process and good electrical connection with the electrodes 1 via the contact holes 2 can be obtained.

Figure 5:
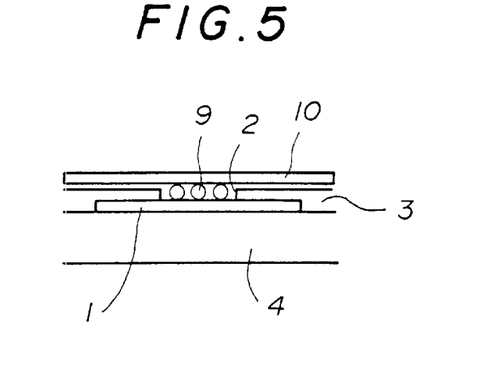
FIG. 5 shows electrical connection between a conductive layer 10 and the electrode 1 through conductive particles 9 in the electrode connecting hole 2.
Figure 6:
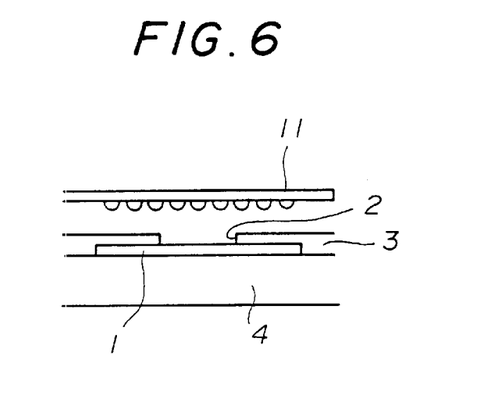
FIG. 6 shows electrical connection using a conductive layer 11 having a surface having irregularities.
Figure 7:
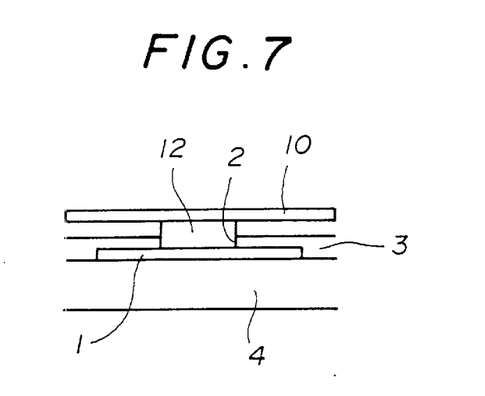
FIG. 7 shows electrical connection between the electrode 1 and the conductive layer 10 through a deposited conductive layer 12 in the electrode connecting hole 2.

In order to electrically connect the electrodes on the substrate with an external circuit via the contact holes, respectively, a method in which metallic-material film is formed on the insulating layer through an ordinary vapor deposition method or the like can be used. On the other hand, a method in which a conductive resin such as silver paste or the like is used can be easily performed. However, the plastic film substrate changes in dimensions due to thermal hysteresis, and changes in temperature and humidity, as mentioned above. Therefore, it is likely that the conductive resin peels off and poor electrical connection with the electrodes via the contact holes, respectively, occurs. Such phenomenon is more likely to occur when the size of each of the contact holes is small. When various trials were made in order to eliminate occurrence of poor electrical connection, it was found that the following methods are effective: a method in which conductive resin which can change in size in response to a change in shape of the substrate, for example, a resin, such as polyester, polyurethane, silicon or the like, which has a small elastic modulus, is used for electrically connecting the electrodes with an external circuit via the contact holes, respectively; a method in which, as shown in FIG. 5, after conductive particles 9, such as those made of nickel, gold or the like, or conductive resin particles 9, each of which has a metal film coated thereon, are scattered in each contact hole 2, a conductive layer 10 such as conductive paste, a metal plate, a metal tape or the like is pressed on the insulating layer 3; a method in which, as shown in FIG. 6, a conductive layer 11 having a surface having irregularities is pressed on the insulating layer 3; and a method in which, as shown in FIG. 7, after a conductive layer 12 is deposited through plating or the like in each contact hole 2, a conductive layer 10 such as conductive paste, a metal plate, a metal tape or the like is pressed on the insulating layer 3. Further, as a result of using the conductive particles 9, each having the diameter larger than the thickness of the insulating layer 3, to be scattered in each contact hole 2, and/or using the soft conductive particles 9 to be scattered in each contact hole 2, it is possible to obtain more positive electrical connection with the electrodes 1 via the contact holes 2, respectively. Similarly, as a result of using the conductive layer 11 having the surface having irregularities shown in FIG. 6, the irregularity of the surface being made of soft conductive material such as conductive silicon resin, it is possible to obtain more positive electrical connection with the electrodes 1 via the contact holes 2, respectively. Further, as a result of using an adhesive resin tape as the conductive layer 10 or 11, shown in FIGS. 5, 6 or 7, the work efficiency in the filter manufacturing process can be improved.

Embodiments of the present invention will now be described.

A first embodiment of the present invention will now be described.

A transparent conductive layer on a plastic film in a transparent conductive film FST-5340 (substrate, made by Sumitomo Bakelite Co., Ltd. of Japan) having the size of 150 mm by 150 mm and the thickness of 0.15 mm is processed through an ordinary photolithography method so that 960 stripe-shaped electrodes 1 are formed, the pitch thereof being 110 $\mu$m, and the width of each electrode being 90 $\mu$m. Then, after posi-type photoresist is coated on the entire surface of the substrate so that a layer having the thickness of approximately 2 $\mu$m is formed thereon, a photo-mask is used, exposure and development are performed, and thus, the insulating layer 3, having the contact holes 2 each having the width of 20 $\mu$m and the length of 100 $\mu$m formed therein, is formed, as shown in FIG. 3. Thus, a plastic film substrate in the first embodiment is produced. In this case, the contact holes 2 each having the width of 20 $\mu$m are aligned with the electrodes 1 each having the width 90 $\mu$m, respectively. Thus, the alignment margin is 70 $\mu$m. Therefore, when the change in dimensions of the substrate is within the range of ±0.02%, it is possible to align each contact hole 2 with a respective one of the electrodes 1. In this embodiment, as a result of managing the time from the pre-baking finish time until the exposure, the dimensions of the substrate are controlled to be within ±0.02%.

A second embodiment of the present invention will now be described.

Similar to the first embodiment, a transparent conductive layer on a plastic film in a transparent conductive film FST-5340 (substrate, made by Sumitomo Bakelite Co., Ltd. of Japan) having the size of 150 mm by 150 mm and the thickness of 0.15 mm is processed through an ordinary photolithography method so that the 960 stripe-shaped electrodes 1 are formed, the pitch thereof being 110 $\mu$m, and the width of each electrode being 90 μm. At a position where the contact holes 2 are formed, the electrodes 1 have patterns such as those shown in FIG. 4. Thus, at the position, the width w1 of each electrode 1 is widened to 250 μm. In this pattern, the width w1' of the electrodes 1 at which the width of the electrodes 1 is narrowest is 20 μm. Then, after posi-type photoresist is coated on the entire surface of the substrate so that a layer having the thickness of approximately 2 μm is formed, a photo-mask is used, exposure and development are performed, and thus, similar to the first embodiment, the insulating layer 3, having the contact holes 2 each having the width of 20 μm and the length of 100 μm formed therein, is formed. Thus, a plastic film substrate in the second embodiment is produced. In this case, the contact holes 2 each having the width of 20 μm are aligned with the electrodes 1 each having the width 250 μm at the position where the contact holes 2 are formed, respectively. Thus, the alignment margin is 230 μm. Therefore, when the change in dimensions of the substrate is within the range of ±0.08% (larger than ±0.02% in the first embodiment), it is possible to align each contact hole 2 with a respective one of the electrodes 1.

A third embodiment of the present invention will now be described.

Figure 8:
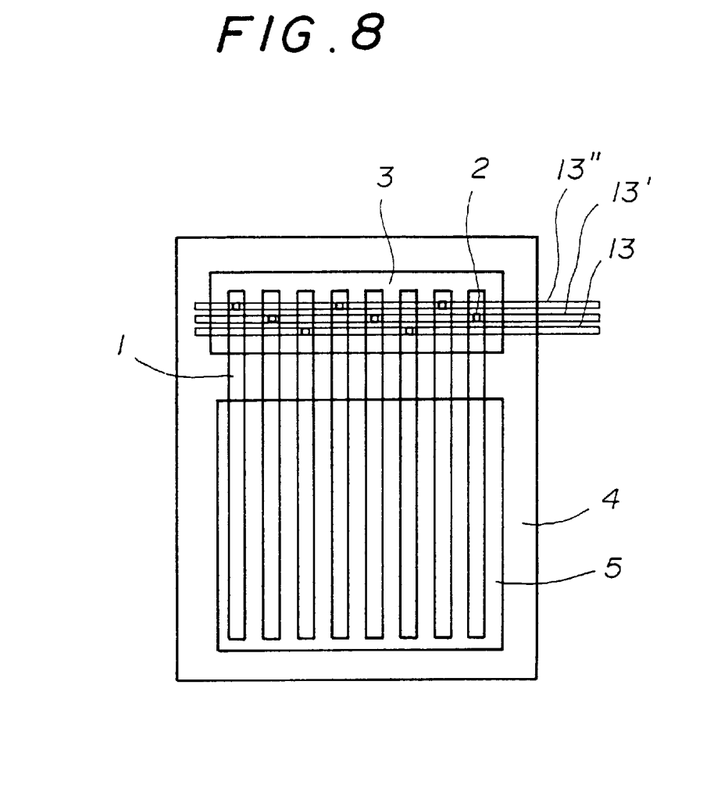
FIG. 8 shows a plastic film substrate in the first embodiment of the present invention having a conductive paste coated thereon, the thus-coated conductive paste being dried.

The plastic film substrate in the first embodiment is annealed for one hour at 180° C. so that a solvent resistance of the photoresist is increased. Then, conductive paste, which is obtained as a result of filler (minute powder) of silver being dispersed in polyurethane resin, is coated by a dispenser at a position 13 shown in FIG. 8, and is dried at 120° C. The conductive paste after being dried has a width of 0.5 mm and a thickness of 0.5 mm. The substrate on which the conductive paste has been thus formed is immersed in micelle solution consisting of red hydrophobic pigment, conductive particles, surfactants and a supporting electrolyte. Then, a voltage is applied to the conductive paste, and thereby, red conductive color filter layers are formed on the electrodes 1, respectively, which are connected with the conductive paste and are thus selected. Then, the substrate is washed by demineralized water, and then, is dried at 120° C. Similarly, after the conductive paste is coated at a position 13' shown in FIG. 8, by using a micelle solution in which green hydrophobic pigment instead of the red hydrophobic pigment is dispersed, green conductive color filter layers are formed. Similarly, after the conductive paste is coated at a position 13" shown in FIG. 8, by using a micelle solution in which blue hydrophobic pigment instead of the red hydrophobic pigment is dispersed, blue conductive color filter layers are formed. Thus, a plastic color filter including the red, green and blue color filter layers is formed. (The contact holes 2 formed on the electrodes 1 on which the green color filter layers are formed are apart from the contact holes 2 formed on the electrodes 1 on which the red color filter layers are formed sufficiently so that the conductive paste coated at the position 13' does not come into contact with the conductive paste coated at the position 13. Similarly, the contact holes 2 formed on the electrodes 1 on which the blue color filter layers are formed are apart from the contact holes 2 formed on the electrodes 1 on which the green color filter layers are formed sufficiently so that the conductive paste coated at the position 13" does not come into contact with the conductive paste coated at the position 13'.) Thus, a plastic color filter (substrate) is produced. As a result of the soft polyurethane resin being used as the conductive paste, electrical connection between the conductive paste and the electrodes 1 can be positively performed. As a result, a color filter free from a coloring defect can be produced.

A fourth embodiment of the present invention will now be described.

The plastic film substrate in the first embodiment is annealed for one hour at 180° C. so that a solvent resistance of the photoresist is increased. Then, conductive paste, which is obtained as a result of filler (minute powder) of silver being dispersed in acrylic resin, is coated by a dispenser, after nickel particles each having the diameter of 1 μm are scattered in each contact hole, and is dried at 100° C. Then, in a method similar to the method described in the description of the third embodiment, the conductive color filter layers are formed. Thus, the plastic color filter (substrate) is produced. In comparison to the polyurethane resin or silicon resin, the acrylic resin has a large elastic modulus. As a result, poor electrical connection with the electrodes 1 is likely to occur. However, as a result of the conductive particles (nickel particles) being scattered in each contact hole before the conductive paste of the acrylic resin is coated, electrical connection between the conductive paste and the electrodes 1 can be positively performed through the conductive particles. As a result, the color filter free from a coloring defect can be produced.

A fifth embodiment of the present invention will now be described.

After nickel particles each having a diameter of 3 μm are scattered in each contact hole 2 of the plastic film substrate in the first embodiment, an aluminum plate having a width of 2 mm, a thickness of 2 mm and a length of 200 mm is pressed on the insulating layer 3. Thus, the aluminum plate 10 and the electrodes 1 are electrically connected through the nickel particles 9 as shown in FIG. 5. Then, in a method similar to the method described in the description of the third embodiment, the conductive color filter layers are formed on the electrodes 1, respectively. In the fifth embodiment, the aluminum plate is pressed at the position 13 shown in FIG. 8 when the red color filter layers are formed, is pressed at the position 13' when the green color filter layers are formed, and is pressed at the position 13" when the blue color filter layers are formed. (The contact holes 2 formed on the electrodes 1 on which the green color filter layers are formed are apart from the contact holes 2 formed on the electrodes 1 on which the red color filter layers are formed sufficiently, and the contact holes 2 formed on the electrodes 1 on which the blue color filter layers are formed are apart from the contact holes 2 formed on the electrodes 1 on which the green color filter layers are formed sufficiently so that the aluminum plate pressed at the position 13 covers neither the contact holes 2 which should be pressed by the aluminum plate when the aluminum plate is pressed at the position 13' nor the contact holes 2 which should be pressed by the aluminum plate when the aluminum plate is pressed at the position 13", the aluminum plate pressed at the position 13' covers neither the contact holes 2 which should be pressed by the aluminum plate when the aluminum plate is pressed at the position 13 nor the contact holes 2 which should be pressed by the aluminum plate when the aluminum plate is pressed at the position 13", and the aluminum plate pressed at the position 13" covers neither the contact holes 2 which should be pressed by the aluminum plate when the aluminum plate is pressed at the position 13 nor the contact holes 2 which should be pressed by the aluminum plate when the aluminum plate is pressed at the position 13'.) Thus, the plastic color filter (substrate) is produced. As a result of using the conductive particles (nickel particles) each having the diameter larger than the thickness of the insulating layer 3, merely by pressing a conductive layer such as a metal plate (aluminum plate) on the insulating layer 3, good electrical connection with the electrodes 1 on the film substrate via the contact holes 2 can be obtained through the conductive particles 9.

A sixth embodiment of the present invention will now be described.

After polystyrene particles each having a diameter of 3 μm and plated by nickel are scattered in each contact hole 2 of the plastic film substrate in the first embodiment, the aluminum plate is pressed on the insulating layer 3 similar to the fifth embodiment. Thus, the aluminum plate 10 and the electrodes 1 are electrically connected through the nickel-plated polystyrene particles 9 as shown in FIG. 5. Then, in a method similar to the method described in the description of the fifth embodiment, the conductive color filter layers are formed on the electrodes 1, respectively. Thus, the plastic color filter (substrate) is produced. Because the nickel-plated polystyrene particles are soft, better electrical connection with the electrodes 1 on the film substrate via the contact holes 2 can be obtained through the conductive particles 9.

A seventh embodiment will now be described.

After polystyrene particles each having a diameter of 3 μm and plated by nickel are scattered in each contact hole 2 of the plastic film substrate in the first embodiment, a conductive shield tape made by Sumitomo 3M Limited., instead of the aluminum plate in the sixth embodiment, is stuck on the insulating layer 3. Thus, the conductive shield tape 10 and the electrodes 1 are electrically connected through the nickel-plated polystyrene particles 9 as shown in FIG. 5. Then, in a method similar to the method described in the description of the third embodiment, the conductive color filter layers are formed on the electrodes 1, respectively. In the seventh embodiment, the conductive shield tape is stuck at the position 13 shown in FIG. 8 when the red color filter layers are formed, is stuck at the position 13' when the green color filter layers are formed, and is stuck at the position 13" when the blue color filter layers are formed. (The contact holes 2 formed on the electrodes 1 on which the green color filter layers are formed are apart from the contact holes 2 formed on the electrodes 1 on which the red color filter layers are formed, sufficiently, so that the conductive shield tape stuck at the position 13' does not come into contact with the conductive shield tape stuck at the position 13. Similarly, the contact holes 2 formed on the electrodes 1 on which the blue color filter layers are formed are apart from the contact holes 2 formed on the electrodes 1 on which the green color filter layers are formed, sufficiently, so that the conductive shield tape stuck at the position 13" does not come into contact with the conductive shield tape stuck at the position 13'.) Thus, the plastic color filter (substrate) is produced. Because the conductive shield tape 10 uses a conductive adhesive layer, good electrical connection is achieved with the electrodes 1 on the substrate via the contact holes 2 through the nickel-plated polystyrene particles 9, merely as a result of the conductive shield tape 10 being stuck on the insulating layer 3.

An eighth embodiment of the present invention will now be described.

After a dry film resist of a thickness of 10 μm is stuck on a glass substrate of a thickness of 2 mm and an area of 200 mm², mask exposure and development are performed. Thus, a surface having irregularities having a height of 5 μm with a pitch of approximately 10 μm is formed on the glass substrate. Then, an aluminum layer of a thickness of 1 μm is formed on the surface having the irregularities of the substrate in an ordinary vapor deposition method. Then, as a result of this substrate being scribed to a strip of a width of 2 mm, a conductive substrate 11, such as that shown in FIG. 6, having the surface having the irregularities of the height of 5 μm is formed. The conductive surface having the irregularities of the thus-formed conductive substrate is pressed on the insulating layer 3 of the plastic film substrate in the first embodiment. Thus, the conductive substrate is electrically connected with the electrodes 1 on the plastic film substrate via the contact holes 2. Then, in a method similar to the method described in the description of the fifth embodiment, the conductive color filter layers are formed. In the eighth embodiment, the conductive substrate having the surface having the irregularities is used instead of the aluminum plate in the fifth embodiment. Thus, the plastic color filter (substrate) is produced.

A ninth embodiment of the present invention will now be described.

As a result of room-temperature-setting conductive silicon-resin paste being sprayed on a surface of an aluminum plate having a width of 2 mm, a thickness of 2 mm and a length of 200 mm, a conductive substrate 11, such as that shown in FIG. 6, having the surface having irregularities of a height of 5 μm, is formed. The surface having the irregularities of the thus-formed conductive substrate is pressed on the insulating layer 3 of the plastic film substrate in the first embodiment. Thus, the conductive substrate is electrically connected with the electrodes 1 on the plastic film substrate via the contact holes 2. Then, in a method similar to the method described in the description of the eighth embodiment, the conductive color filter layers are formed. Thus, the plastic color filter (substrate) is produced. As a result of the irregularities of the surface of the conductive substrate being formed of the conductive silicon resin, it is possible to electrically connect with the electrodes on the plastic film substrate more positively.

A tenth embodiment of the present invention will now be described.

Similar to the ninth embodiment, a surface having irregularities is formed of conductive silicon resin on the conductive adhesive layer of the conductive shield tape made by Sumitomo 3M Limited. The surface having the irregularities of the conductive silicon resin of the conductive shield tape is stuck on the insulating layer 3 of the plastic film substrate in the first embodiment. Thus, the conductive shield tape is electrically connected with the electrodes 1 on the plastic film substrate via the contact holes 2. Then, in a method similar to the method described in the description of the seventh embodiment, the conductive color filter layers are formed. Thus, the plastic color filter (substrate) is produced.

An eleventh embodiment of the present invention will now be described.

The plastic film substrate in the first embodiment is annealed for one hour at 180° C. so that a solvent resistance of the photoresist is increased. Then, nickel is plated in each contact hole 2 of the insulating layer 3 of the plastic film substrate so that a nickel layer having a thickness of 1 μm is formed in the contact hole 2. The composition of the plating bath is nickel sulfamate, boric acid and sulfamic acid. Further, a value of a current during the plating is controlled to 0.01 A/100 m². Then, conductive paste, which is obtained as a result of filler (minute powder) of silver being dispersed in acrylic resin, is coated on the insulating layer 3 by a dispenser, and is dried at 100° C. Then, in a method similar to the method described in the description of the third embodiment, the conductive color filter layers are formed. Thus, the plastic color filter (substrate) is produced. As a result of performing nickel plating in each contact hole 2, the depth of the contact hole 2 is reduced, and the conductive paste is well stuck on the thus-formed nickel layers. As a result, good electrical connection with the electrodes 1 on the plastic film substrate can be obtained.

A twelfth embodiment of the present invention will now be described.

Similar to the eleventh embodiment, nickel plating is performed in each contact hole 2 so that a layer having a thickness of 3 μm is formed. Then, an aluminum plate having a width of 2 mm, a thickness of 2 mm and a length of 200 mm is pressed at the position 13 shown in FIG. 8. Thus, the aluminum plate 10 is electrically connected with the electrodes 1 on the substrate 4 via the contact holes 2 through the nickel layers 12 formed through the nickel plating, as shown in FIG. 7. Then, in a method similar to the method described in the description of the fifth embodiment, the conductive color filter layers are formed. Thus, the plastic color filter (substrate) is produced. Thus, as a result of the metal layer being formed in each contact hole 2 through plating, the metal layer having a thickness greater than the thickness of the insulating layer 3, good electrical connection with the electrodes 1 on the film substrate can be obtained, merely as a result of a conductive layer such as a metal plate being pressed on the insulating layer 3.

A thirteenth embodiment will now be described.

After nickel plating is performed in each contact hole 2 of the plastic film substrate in the first embodiment, in a method similar to the method described in the description of the eleventh embodiment, so that a nickel layer of 3 μm is formed, the conductive shield tape made by Sumitomo 3M Limited, instead of the aluminum plate in the twelfth embodiment, is stuck on the insulating layer 3. Thus, the conductive shield tape 10 and the electrodes 1 are electrically connected via the contact holes 2 through the nickel layers 12 formed through the plating, as shown in FIG. 7. Then, in a method similar to the method described in the description of the seventh embodiment, the conductive color filter layers are formed on the electrodes 1, respectively. Thus, the plastic color filter (substrate) is produced. Because the conductive shield tape uses a conductive adhesive layer, good electrical connection is obtained with the electrodes 1 on the plastic substrate via the contact holes 2 through the nickel layers 12, merely as a result of the conductive shield tape 10 being stuck on the insulating layer 3.

A fourteenth embodiment of the present invention will now be described.

Figure 9:
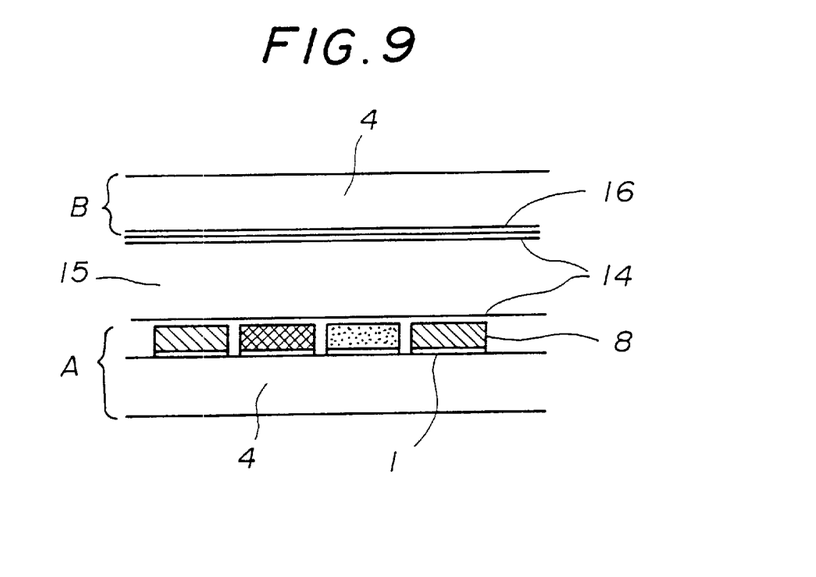
FIG. 9 shows a liquid-crystal cell in a fourteenth embodiment of the present invention.

After the electrode drawing-out portion is cut off from any of the plastic color filters (substrates) in the third through thirteenth embodiments, an alignment layer for liquid crystal having a thickness of 0.1 μm is formed as a result of the agent AL3046 made by Japan Synthetic Rubber Co., Ltd. (JSR) being coated on the plastic color filter (substrate). Then, rubbing is performed and thus an alignment process is performed on the plastic color filter (substrate) having the alignment layer thus formed thereon. Then, the thus-obtained substrate and an opposite substrate, which has 240 stripe-shaped electrodes and has an alignment process performed thereon, are stuck together. Then, a liquid crystal is injected between the two opposite substrates. Thus, an STN (Super Twisted Nematic)-mode liquid-crystal cell having a twist angle of 240 degrees and a cell gap of 7 μm is produced. The cross-sectional view of this cell is shown in FIG. 9. In the cross-sectional view, the plastic color filter substrate A in any of the third through thirteenth embodiments includes the plastic film substrate 4, the electrodes 1 and conductive color filters 8, and has an alignment layer 14 formed thereon. The opposite substrate B includes stripe-shaped electrodes 16 and has the alignment layer 14 formed thereon. After the two substrates A and B are stuck together, the liquid crystal 15 is injected between the two substrates A and B. A circuit for driving the liquid crystal is connected to the thus-obtained liquid crystal cell. Then, the liquid crystal cell is sandwiched by polycarbonate color compensators and polarizers. Thus, a color liquid-crystal display device is completed. The thus-obtained color liquid-crystal display device can perform improved color display.

In a method for completing the color liquid-crystal display device in the fourteenth embodiment, the process of forming the alignment layers on the two substrates A and B, respectively, the alignment process performed on the two substrates A and B, the process of sticking the thus-obtained two substrates A and B together, the process of injecting the liquid crystal therebetween, the process of connecting the circuit for driving the liquid crystal to the thus-obtained liquid-crystal cell, the process of sandwiching the liquid-crystal cell with the polycarbonate color compensators and polarizers are those in accordance with a manner for producing a liquid-crystal display device well known in the field of liquid crystal display devices.

Further, the present invention is not limited to the above-described embodiments, and variations and modifications may be made without departing from the scope of the present invention.

The contents of the basic Japanese Patent Application No.9-254193, filed on Sept. 3, 1997, are hereby incorporated by reference.

What is claimed is:

1. A plastic color filter manufacturing method, comprising the steps of:

forming an insulating layer on a plurality of electrodes formed on a plastic film substrate, said insulating layer having a plurality of electrode connecting holes formed therein;

selectively connecting electrodes of said plurality of electrodes to an external circuit via respective ones of said plurality of connecting holes, in turn; and forming conductive color filter layers on the thus-connected electrodes, respectively, by an electrochemical method, wherein a value obtained as a result of subtracting a width of each one of the plurality of electrode connecting holes from a width of a respective one of the plurality of electrodes is large enough so that a position of the electrode connecting hole is prevented from deviating from a position of the electrode even when the plastic film substrate expands or contracts maximally.

2. The plastic color filter manufacturing method as claimed in claim 1, wherein the width of each one of said plurality of electrodes at a position where a respective one of said plurality of electrode connecting holes is placed is greater than a width of the electrode at a position at which the conductive color filter layer is formed thereon.

3. The plastic color filter manufacturing method as claimed in claim 1, wherein the electrical connection between the selected ones of said plurality of electrodes and the external circuit is performed through a conductive resin which can change in shape in response to a change in shape of the plastic film substrate.

4. The plastic color filter manufacturing method as claimed in claim 1, wherein the step of electrically connecting the selected ones of said plurality of electrodes with the external circuit comprises the steps of:

scattering conductive particles in at least respective ones of said plurality of electrode connecting holes; and performing the electrical connection of said the selected ones of said plurality of electrodes with the external circuit through said conductive particles and a conductive material.

5. The plastic color filter manufacturing method as claimed in claim 4, wherein a diameter of each of said conductive particles is larger than a thickness of said insulating layer, and the electrical connection is made between the selected ones of said plurality of electrodes and the external circuit as a result of said conductive material being pressed on said insulating layer.

6. The plastic color filter manufacturing method as claimed in claim 4, wherein each of said conductive particles is soft.

7. The plastic color filter manufacturing method as claimed in claim 1, wherein the step of electrically connecting the selected ones of said plurality of electrodes with the external circuit comprises the step of:

depositing a layer in each of at least respective ones of said plurality of electrode connecting holes; and electrically connecting the selected ones of said plurality of electrodes with said external circuit through the thus-deposited layers and a conductive material.

8. The plastic color filter manufacturing method as claimed in claim 7, wherein a thickness of each of the deposited layers is larger than a thickness of said insulating layer, and the electrical connection is made between the selected ones of said plurality of electrodes and the external circuit as a result of said conductive material being pressed on said insulating layer.

9. The plastic color filter manufacturing method as claimed in claim 7, wherein said deposited layers comprise layers formed through plating.

10. The plastic color filter manufacturing method as claimed in claim 4, wherein said conductive material comprises an adhesive tape.

11. The plastic color filter manufacturing method as claimed in claim 7, wherein said conductive material comprises an adhesive tape.

12. The plastic color filter manufacturing method as claimed in claim 1, wherein the step of electrically connecting the selected ones of said plurality of electrodes with the external circuit is performed by using a conductive material which has a surface having irregularities of a height on the order of a thickness of said insulating layer.

13. The plastic color filter manufacturing method as claimed in claim 12, wherein the irregularities of the surface of the conductive material comprise soft conductive resin.

14. The plastic color filter manufacturing method as claimed in claim 12, wherein the conductive material comprises an adhesive tape.

15. A plastic color filter comprising:

a plastic film substrate;

a plurality of electrodes formed on said plastic film substrate;

an insulating layer formed on said plurality of electrodes formed on said plastic film substrate, said insulating layer having a plurality of electrode connecting holes formed therein; and conductive color filter layers formed on said plurality of electrodes, respectively, by an electrochemical method, as a result of selected electrodes of said plurality of electrodes being connected to an external circuit via respective ones of said plurality of connecting holes, in turn, wherein a value obtained as a result of subtracting a width of each one of the plurality of electrode connecting holes from a width of a respective one of the plurality of electrodes is large enough so that a position of the electrode connecting hole is prevented from deviating from a position of the electrode even when the plastic film substrate expands or contracts maximally.

16. The plastic color filter as claimed in claim 15, wherein the width of each one of said plurality of electrodes at a position where a respective one of said plurality of electrode connecting holes is placed is greater than a width of the electrode at a position at which the conductive color filter layer is formed on the electrode.

17. The plastic color filter as claimed in claim 15, wherein the electrical connection between the selected ones of said plurality of electrodes and the external circuit is performed through a conductive resin which can change in shape in response to a change in shape of the plastic film substrate.

18. The plastic color filter as claimed in claim 15, wherein the electrical connection of the selected ones of said plurality of electrodes with the external circuit is performed as a result of conductive particles being scattered in at least respective ones of said plurality of electrode connecting holes, the electrical connection of said the selected ones of said plurality of electrodes with the external circuit being performed through said conductive particles and a conductive material.

19. The plastic color filter as claimed in claim 18, wherein a diameter of each of said conductive particles is larger than a thickness of said insulating layer, and the electrical connection is made between selected ones of said plurality of electrodes and the external circuit as a result of said conductive material being pressed on said insulating layer.

20. The plastic color filter as claimed in claim 18, wherein said conductive particles are soft.

21. The plastic color filter as claimed in claim 15, wherein the electrical connection of the selected ones of said plurality of electrodes with the external circuit is performed as a result of a layer being deposited in each of at least respective ones of said plurality of electrode connecting holes, the electrical connection of the selected ones of said plurality of electrodes with said external circuit being performed through the thus-deposited layers and a conductive material.

22. The plastic color filter as claimed in claim 21, wherein a thickness of each of the deposited layers is larger than a thickness of said insulating layer, and the electrical connection is made between the selected ones of said plurality of electrodes and the external circuit as a result of said conductive material being pressed on said insulating layer.

23. The plastic color filter as claimed in claim 21, wherein said deposited layers comprise layers formed through plating.

24. The plastic color filter as claimed in claim 18, wherein said conductive material comprises an adhesive tape.

25. The plastic color filter as claimed in claim 21, wherein said conductive material comprises an adhesive tape.

26. The plastic color filter as claimed in claim 15, wherein the electrical connection of the selected ones of said plurality of electrodes with the external circuit is performed by using a conductive material which has a surface having irregularities of a height on the order of a thickness of said insulating layer.

27. The plastic color filter as claimed in claim 26, wherein the irregularities of the surface of the conductive material comprise soft conductive resin.

28. The plastic color filter as claimed in claim 27, wherein the conductive material comprises an adhesive tape.

29. A color liquid-crystal display device comprising:

two substrates; and an electrooptic-material layer, a light transmitting condition thereof being electrically controlled, said electrooptic material layer being sandwiched by said two substrates, wherein, as a result of an electric field being applied to said electrooptic-material layer by a plurality of electrodes, on which conductive color filter layers are formed, said electrooptic-material layer displays information, and wherein at least one of said two substrate comprises a plastic color filter, said plastic color filter comprising:

a plastic film substrate;

said plurality of electrodes formed on said plastic film substrate;

an insulating layer formed on said plurality of electrodes formed on said plastic film substrate, said insulating layer having a plurality of electrode connecting holes formed therein; and said conductive color filter layers formed on said plurality of electrodes, respectively, by an electrochemical method, as a result of selected electrodes of said plurality of electrodes being connected to an external circuit via respective ones of said plurality of connecting holes, in turn, wherein a value obtained as a result of subtracting a width of each one of the plurality of electrode connecting holes from a width of a respective one of the plurality of electrodes is large enough so that a position of the electrode connecting hole is prevented from deviating from a position of the electrode even when the plastic film substrate expands or contracts maximally.

30. The color liquid-crystal display device as claimed in claim 29, wherein the width of each one of said plurality of electrodes at a position where a respective one of said plurality of electrode connecting holes is placed is greater than a width of the electrode at a position at which the conductive color filter layer is formed on the electrode.

31. The color liquid-crystal display device as claimed in claim 29, wherein the electrical connection between the selected ones of said plurality of electrodes and the external circuit is performed through conductive resin which can change in shape in response to a change in shape of the plastic film substrate.

32. The color liquid-crystal display device as claimed in claim 29, wherein the electrical connection of the selected ones of said plurality of electrodes with the external circuit is performed as a result of conductive particles being scattered in at least respective ones of said plurality of electrode connecting holes, the electrical connection of said the selected ones of said plurality of electrodes with the external circuit being performed through said conductive particles and a conductive material.

33. The color liquid-crystal display device as claimed in claim 32, wherein a diameter of each of said conductive particles is larger than a thickness of said insulating layer, and the electrical connection is made between selected ones of said plurality of electrodes and the external circuit as a result of said conductive material being pressed on said insulating layer.

34. The color liquid-crystal display device as claimed in claim 32, wherein said conductive particles are soft.

35. The color liquid-crystal display device as claimed in claim 29, wherein the electrical connection of the selected ones of said plurality of electrodes with the external circuit is performed as a result of a layer being deposited in each of at least respective ones of said plurality of electrode connecting holes, the electrical connection of the selected ones of said plurality of electrodes with said external circuit being performed through the thus-deposited layers and a conductive material.

36. The color liquid-crystal display device as claimed in claim 35, wherein a thickness of each of the deposited layers is larger than a thickness of said insulating layer, and the electrical connection is made between the selected ones of said plurality of electrodes and the external circuit as a result of said conductive material being pressed on said insulating layer.

37. The color liquid-crystal display device as claimed in claim 35, wherein said deposited layers comprise layers formed through plating.

38. The color liquid-crystal display device as claimed in claim 32, wherein said conductive material comprises an adhesive tape.

39. The color liquid-crystal display device as claimed in claim 35, wherein said conductive material comprises an adhesive tape.

40. The color liquid-crystal display device as claimed in claim 29, wherein the electrical connection of the selected ones of said plurality of electrodes with the external circuit is performed by using a conductive material which has a surface having irregularities of a height on the order of a thickness of said insulating layer.

41. The color liquid-crystal display device as claimed in claim 40, wherein the irregularities of the surface of the conductive material comprise soft conductive resin.

42. The color liquid-crystal display device as claimed in claim 41, wherein the conductive material comprises an adhesive tape.

* * * * *